US 7,734,693 B2

(12) United States Patent
Ardulov

(10) Patent No.: US 7,734,693 B2
(45) Date of Patent: Jun. 8, 2010

(54) METHODS AND APPARATUSES FOR MANAGING RESOURCES WITHIN A COLLABORATION SYSTEM

(75) Inventor: Yuri Ardulov, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 315 days.

(21) Appl. No.: 11/323,286

(22) Filed: Dec. 29, 2005

(65) Prior Publication Data

US 2007/0156903 A1     Jul. 5, 2007

(51) Int. Cl.
*G06F 11/30* (2006.01)

(52) U.S. Cl. ...................................... 709/204; 709/224

(58) Field of Classification Search ......... 709/204–206, 709/224; 715/751–759; 370/260; 434/350–352
See application file for complete search history.

(56) References Cited

U.S. PATENT DOCUMENTS

| | | | | |
|---|---|---|---|---|
| 6,438,111 | B1* | 8/2002 | Catanzaro et al. | 370/260 |
| 6,744,741 | B1* | 6/2004 | Ju et al. | 370/260 |
| 7,054,933 | B2* | 5/2006 | Baxley et al. | 709/226 |
| 7,069,298 | B2* | 6/2006 | Zhu et al. | 709/204 |
| 7,096,037 | B2* | 8/2006 | Canova et al. | 455/556.1 |
| 7,130,883 | B2* | 10/2006 | Zhu et al. | 709/204 |
| 7,167,182 | B2* | 1/2007 | Butler | 345/537 |
| 2002/0165963 | A1* | 11/2002 | Baxley et al. | 709/226 |
| 2003/0167301 | A1* | 9/2003 | Zhu et al. | 709/204 |
| 2003/0167303 | A1* | 9/2003 | Zhu et al. | 709/204 |
| 2004/0193683 | A1* | 9/2004 | Blumofe | 709/204 |
| 2004/0221010 | A1* | 11/2004 | Butler | 709/204 |
| 2005/0086556 | A1 | 4/2005 | Zhu et al. | |
| 2005/0213557 | A1 | 9/2005 | Hwang et al. | |
| 2006/0098692 | A1* | 5/2006 | D'Angelo | 370/522 |
| 2006/0161651 | A1* | 7/2006 | Ardulov et al. | 709/224 |

OTHER PUBLICATIONS

Andrew S. Tanenbaum; Structured Computer Organization, Second Edition; pp. 10-12; 1984.*
PCT Notification of Transmittal of the International Search Report and the Written Opinion of the International Searching Authority, or the Declaration, International Application No. PCT/US06/62736, International Filing Date: Dec. 29, 2006, Date of mailing of Document Nov. 13, 2008, 11 pages.

* cited by examiner

*Primary Examiner*—Kenneth R Coulter
(74) *Attorney, Agent, or Firm*—Cesari and McKenna, LLP

(57) ABSTRACT

In one embodiment, the methods and apparatuses utilize an application within a meeting zone; monitor usage within the meeting zone; detect a resource located outside the meeting zone; dynamically add the resource within the meeting zone; and update a database configured to track a status of the resource.

21 Claims, 5 Drawing Sheets

METHODS AND APPARATUSES FOR MANAGING RESOURCES WITHIN A COLLABORATION SYSTEM

FIELD OF INVENTION

The present invention relates generally to managing resources and, more particularly, managing resources within a collaboration system.

BACKGROUND

There has been an increased use in collaboration sessions that are Internet or web-based to communicate with employees, vendors, and clients. During these collaboration sessions, information is typically exchanged between multiple participants. This exchanged information may include audio, graphical, and/or textual information.

Exchanging information during the collaboration session typically utilizes bandwidth during transmission to the participants and computational and storage resources for hosting the collaboration session through a collaboration system. During collaboration sessions, increased demands are typically placed on the computational and storage resources within the collaboration system.

SUMMARY

In one embodiment, the methods and apparatuses utilize an application within a meeting zone; monitor usage within the meeting zone; detect a resource located outside the meeting zone; dynamically add the resource within the meeting zone; and update a database configured to track a status of the resource.

BRIEF DESCRIPTION OF THE DRAWINGS

The accompanying drawings, which are incorporated in and constitute a part of this specification, illustrate and explain one embodiment of the methods and apparatuses for managing resources within a collaboration system. In the drawings.

DETAILED DESCRIPTION

The following detailed description of the methods and apparatuses for managing resources within a collaboration system refers to the accompanying drawings. The detailed description is not intended to limit the methods and apparatuses for managing resources within a collaboration system. Instead, the scope of the methods and apparatuses for managing resources within a collaboration system is defined by the appended claims and equivalents. Those skilled in the art will recognize that many other implementations are possible, consistent with the present invention.

References to a device include a desktop computer, a portable computer, a personal digital assistant, a video phone, a landline telephone, a cellular telephone, and a device capable of receiving/transmitting an electronic signal.

Figure 1:
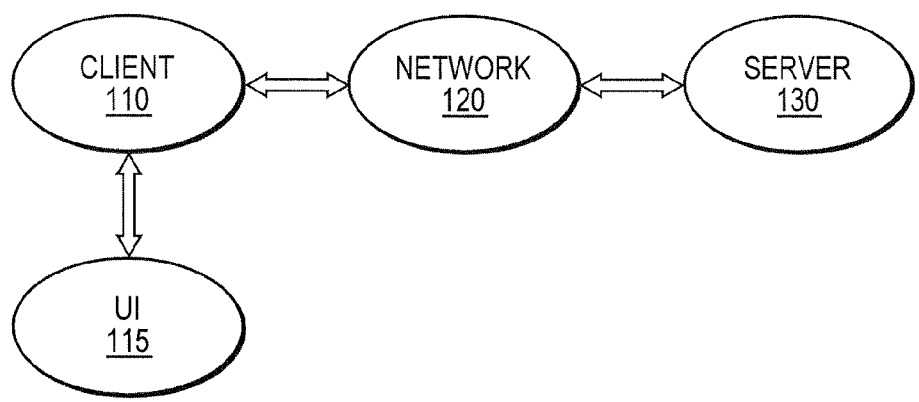
FIG. 1 is a diagram illustrating an environment within which the methods and apparatuses for managing resources within a collaboration system are implemented.

FIG. 1 is a diagram illustrating an environment within which the methods and apparatuses for managing resources within a collaboration system are implemented. The environment includes an electronic device 110 (e.g., a computing platform configured to act as a client device, such as a computer, a personal digital assistant, and the like), a user interface 115, a network 120 (e.g., a local area network, a home network, the Internet), and a server 130 (e.g., a computing platform configured to act as a server).

In one embodiment, one or more user interface 115 components are made integral with the electronic device 110 (e.g., keypad and video display screen input and output interfaces in the same housing such as a personal digital assistant. In other embodiments, one or more user interface 115 components (e.g., a keyboard, a pointing device such as a mouse, a trackball, etc.), a microphone, a speaker, a display, a camera are physically separate from, and are conventionally coupled to, electronic device 110. In one embodiment, the user utilizes interface 115 to access and control content and applications stored in electronic device 110, server 130, or a remote storage device (not shown) coupled via network 120.

In accordance with the invention, embodiments of managing resources within a collaboration system below are executed by an electronic processor in electronic device 110, in server 130, or by processors in electronic device 110 and in server 130 acting together. Server 130 is illustrated in FIG. 1 as being a single computing platform, but in other instances are two or more interconnected computing platforms that act as a server.

Figure 2:
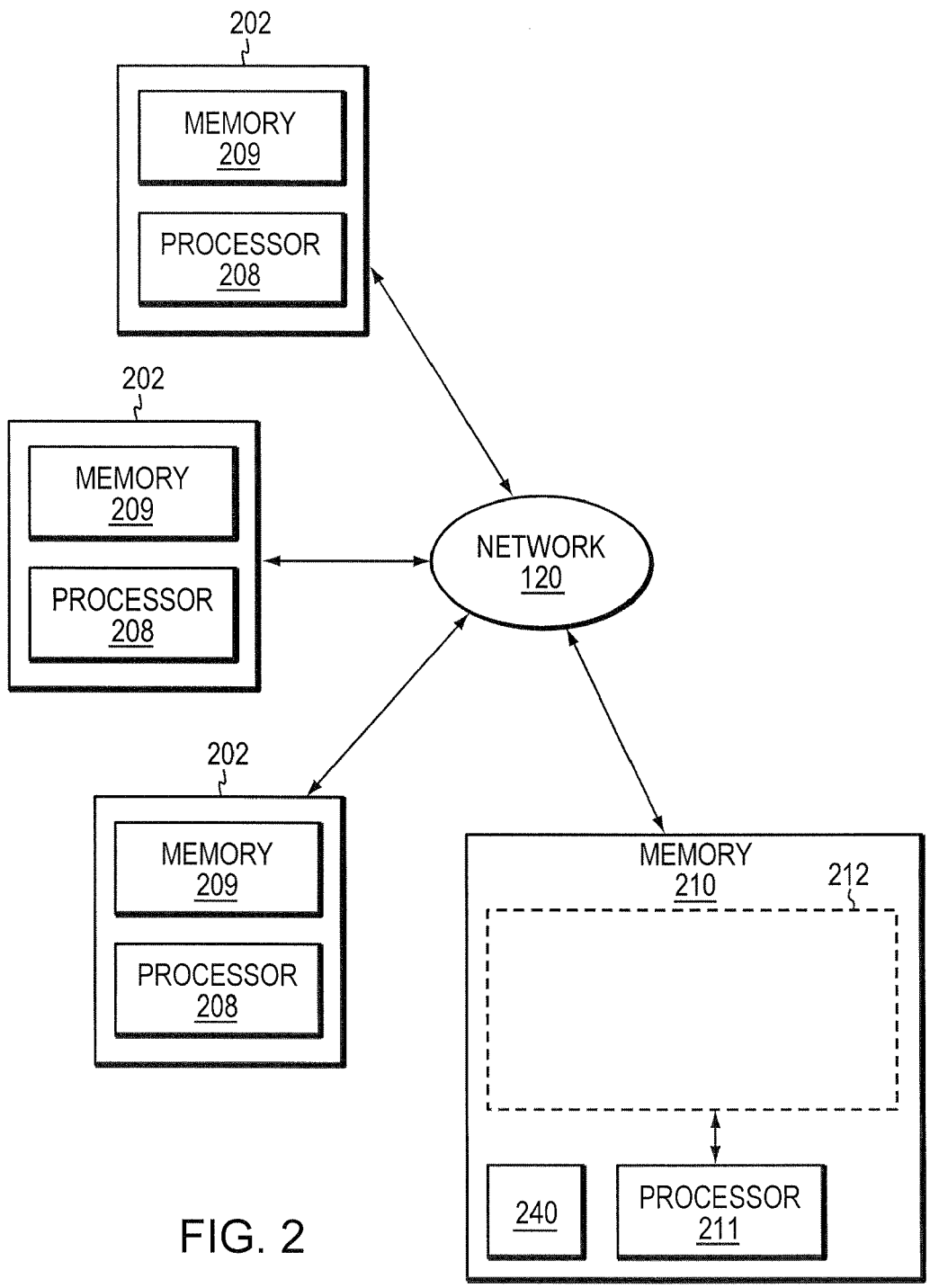
FIG. 2 is a simplified block diagram illustrating one embodiment in which the methods and apparatuses for managing resources within a collaboration system are implemented.

FIG. 2 is a simplified diagram illustrating an exemplary architecture in which the methods and apparatuses for managing resources within a collaboration system are implemented. The exemplary architecture includes a plurality of electronic devices 202, a server device 210, and a network 201 connecting electronic devices 202 to server 210 and each electronic device 202 to each other. The plurality of electronic devices 202 are each configured to include a computer-readable medium 209, such as random access memory, coupled to an electronic processor 208. Processor 208 executes program instructions stored in the computer-readable medium 209. In one embodiment, a unique user operates each electronic device 202 via an interface 115 as described with reference to FIG. 1.

The server device 130 includes a processor 211 coupled to a computer-readable medium 212. In one embodiment, the server device 130 is coupled to one or more additional external or internal devices, such as, without limitation, a secondary data storage element, such as database 240.

In one instance, processors 208 and 211 are manufactured by Intel Corporation, of Santa Clara, Calif. In other instances, other microprocessors are used.

In one embodiment, the plurality of client devices 202 and the server 210 include instructions for a customized application for communicating between messaging and telephony systems. In one embodiment, the plurality of computer-readable media 209 and 212 contain, in part, the customized application. Additionally, the plurality of client devices 202 and the server 210 are configured to receive and transmit electronic messages for use with the customized application. Similarly, the network 210 is configured to transmit electronic messages for use with the customized application.

One or more user applications are stored in media 209, in media 212, or a single user application is stored in part in one media 209 and in part in media 212. In one instance, a stored user application, regardless of storage location, is made customizable based on managing resources within a collaboration system using embodiments described below.

Figure 3:
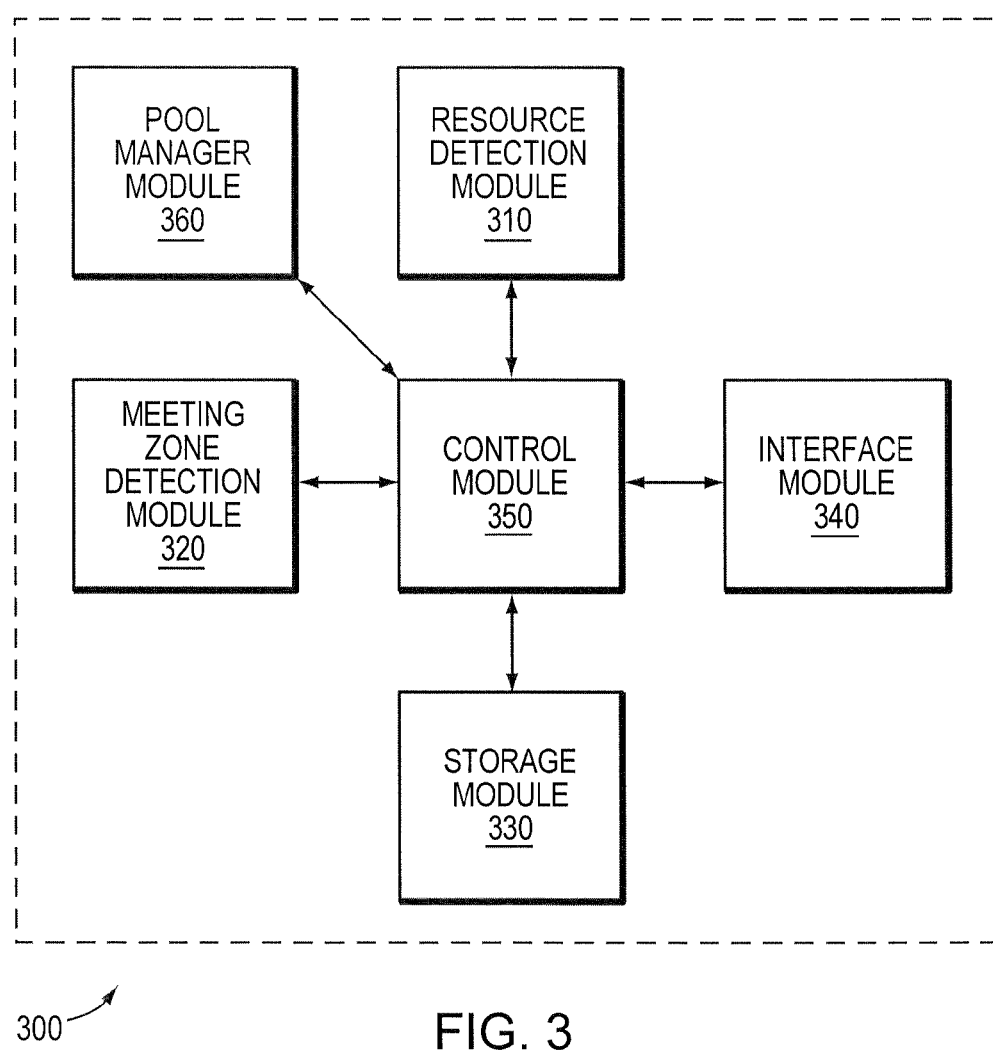
FIG. 3 is a simplified block diagram illustrating a system, consistent with one embodiment of the methods and apparatuses for managing resources within a collaboration system.

FIG. 3 illustrates one embodiment of a system 300. In one embodiment, the system 300 is embodied within the server 130. In another embodiment, the system 300 is embodied within the electronic device 110. In yet another embodiment, the system 300 is embodied within both the electronic device 110 and the server 130.

In one embodiment, the system 300 includes a resource detection module 310, a meeting zone detection module 320, a storage module 330, an interface module 340, a control module 350, and a pool manager module 360.

In one embodiment, the control module 350 communicates with the resource detection module 310, the meeting zone detection module 320, the storage module 330, the interface module 340, and the pool manager module 360. In one embodiment, the control module 350 coordinates tasks, requests, and communications between the resource detection module 310, the meeting zone detection module 320, the storage module 330, the interface module 340, and the pool manager module 360.

In one embodiment, the resource detection module 310 detects a pool box that includes resources. In one embodiment, a pool box is a modular container that represents resources for use by the system 300 for providing collaboration services.

In one embodiment, the meeting zone detection module 320 detects a meeting zone that includes resources such as a pool box. In one embodiment, the meeting zone detection module 320 detects the usage of resources associated with the particular meeting zone.

In one embodiment, the storage module 330 stores information relating to the configuration of the pool boxes and the associated meeting zones.

In one embodiment, the interface module 340 detects resource requests from clients. Further, the interface module 340 delivers confirmation signals to the clients.

In one embodiment, the pool manager module 360 coordinates and manages resources such as the pool boxes within the meeting zones. In one embodiment, the pool manager module 360 moves the pool boxes from one meeting zone to another meeting zone depending on demand.

The system 300 in FIG. 3 is shown for exemplary purposes and is merely one embodiment of the methods and apparatuses for managing resources within a collaboration system. Additional modules may be added to the system 300 without departing from the scope of the methods and apparatuses for managing resources within a collaboration system. Similarly, modules may be combined or deleted without departing from the scope of the methods and apparatuses for managing resources within a collaboration system.

Figure 4:
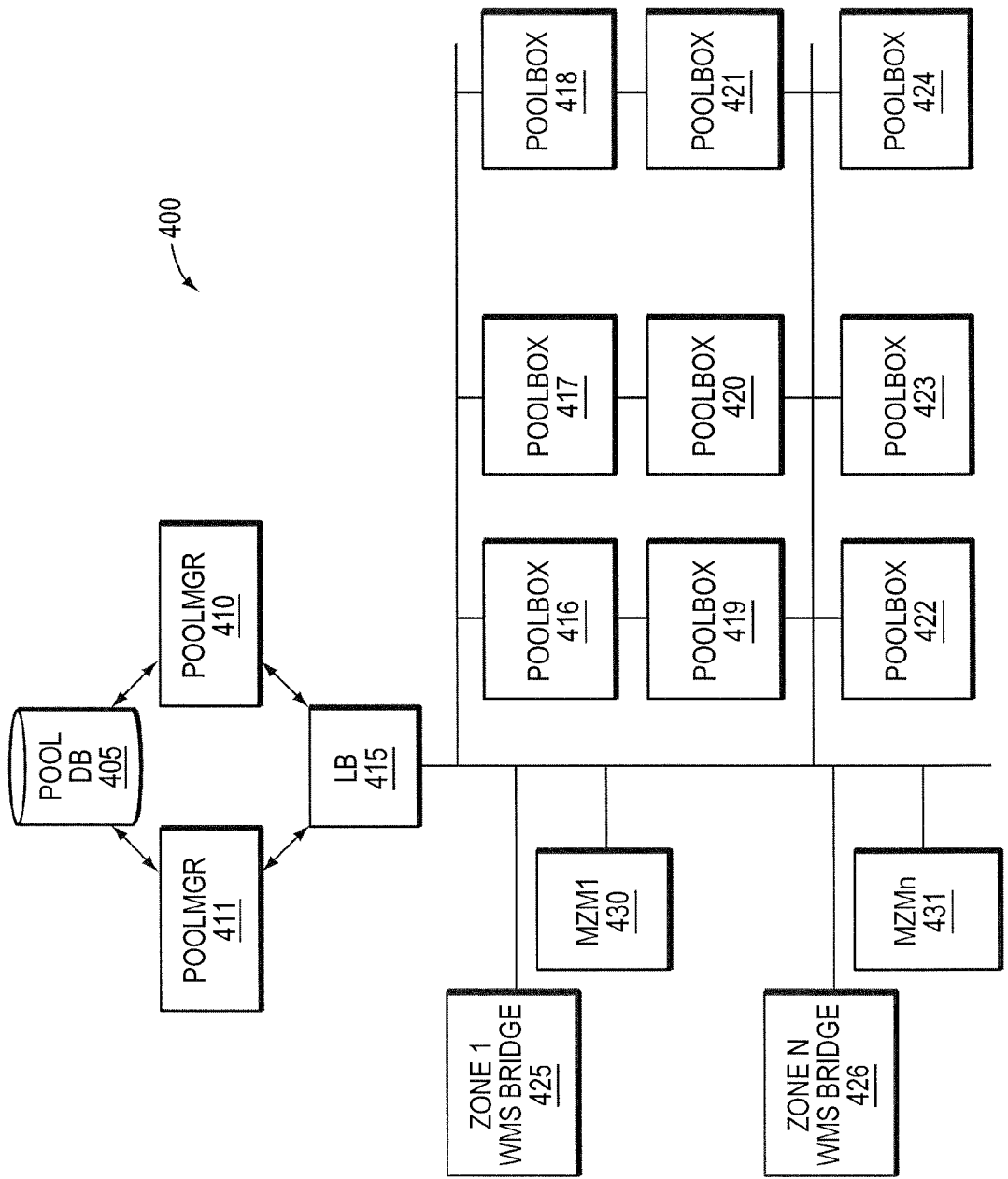
FIG. 4 is a simplified block diagram illustrating a system, consistent with one embodiment of the methods and apparatuses for managing resources within a collaboration system.

FIG. 4 illustrates one embodiment of the methods and apparatuses for managing resources within a collaboration system within a system 400 for use with the system 300 shown in FIG. 3.

In one embodiment, the system 400 is embodied within the server 130. In another embodiment, the system 400 is embodied within the electronic device 110. In yet another embodiment, the system 400 is embodied within both the electronic device 110 and the server 130.

In one embodiment, the system 400 includes a pool database 405; pool managers 410 and 411; a load balancer 415; pool boxes 416, 417, 418, 419, 420, 421, 422, 423, and 424; meeting bridges 425 and 426; and meeting zone managers 430 and 431. The elements within the system 400 are shown for illustrative purposes only. For example, the exact number of pool boxes can vary without departing from the invention. Further, elements may be added, deleted, or combined without departing from the invention.

In one embodiment, the pool boxes 416, 417, 418, 419, 420, 421, 422, 423, and 424 are configured to provide resources. Further, each of the pool boxes 416, 417, 418, 419, 420, 421, 422, 423, and 424 are pre-configured with multiple versions of applications such that each of the pool boxes 416, 417, 418, 419, 420, 421, 422, 423, and 424 are capable of supporting multiple versions of a collaboration session. For example, any of the pool boxes 416, 417, 418, 419, 420, 421, 422, 423, and 424 is capable of supporting multiple versions of a collaboration session. In one embodiment, a pool agent resides within each of the pool boxes 416, 417, 418, 419, 420, 421, 422, 423, and 424. In one embodiment, the pool agent selects the version of the application for use by the pool box for each specific instance.

In one embodiment, each of the pool boxes 416, 417, 418, 419, 420, 421, 422, 423, and 424 is configured to provide resources to one of the meeting zone managers.

In one embodiment, the meeting bridges 425 and 426 are configured to provide interoperability between each of the pool boxes 416, 417, 418, 419, 420, 421, 422, 423, and 424 and the meeting zone managers 430 and 431.

In one embodiment, the meeting zone managers 430 and 431 are configured to accept a request from a client to provide resources for a collaboration session. In one embodiment, the meeting zone managers 430 and 431 detect the requirements for the collaboration session and request a resource (i.e. one of the pool boxes 416, 417, 418, 419, 420, 421, 422, 423, and 424) from one of the pool managers 410 and 411. In one embodiment, each of the meeting zone managers 430 and 431 are associated with a corresponding meeting zone.

In one embodiment, the pool managers 410 and 411 are configured to detect information relating to the pool boxes 416, 417, 418, 419, 420, 421, 422, 423, and 424 from the pool database 405. Further, the pool managers 410 and 411 are configured to select one of the pool boxes 416, 417, 418, 419, 420, 421, 422, 423, and 424 to provide resources to the client that requests resources from one of the meeting zone managers 430 and 431.

In one embodiment, the pool database 405 tracks the status of each of the pool boxes 416, 417, 418, 419, 420, 421, 422, 423, and 424. In one embodiment, the status refers to the availability of the pool boxes 416, 417, 418, 419, 420, 421, 422, 423, and 424.

Figure 5:
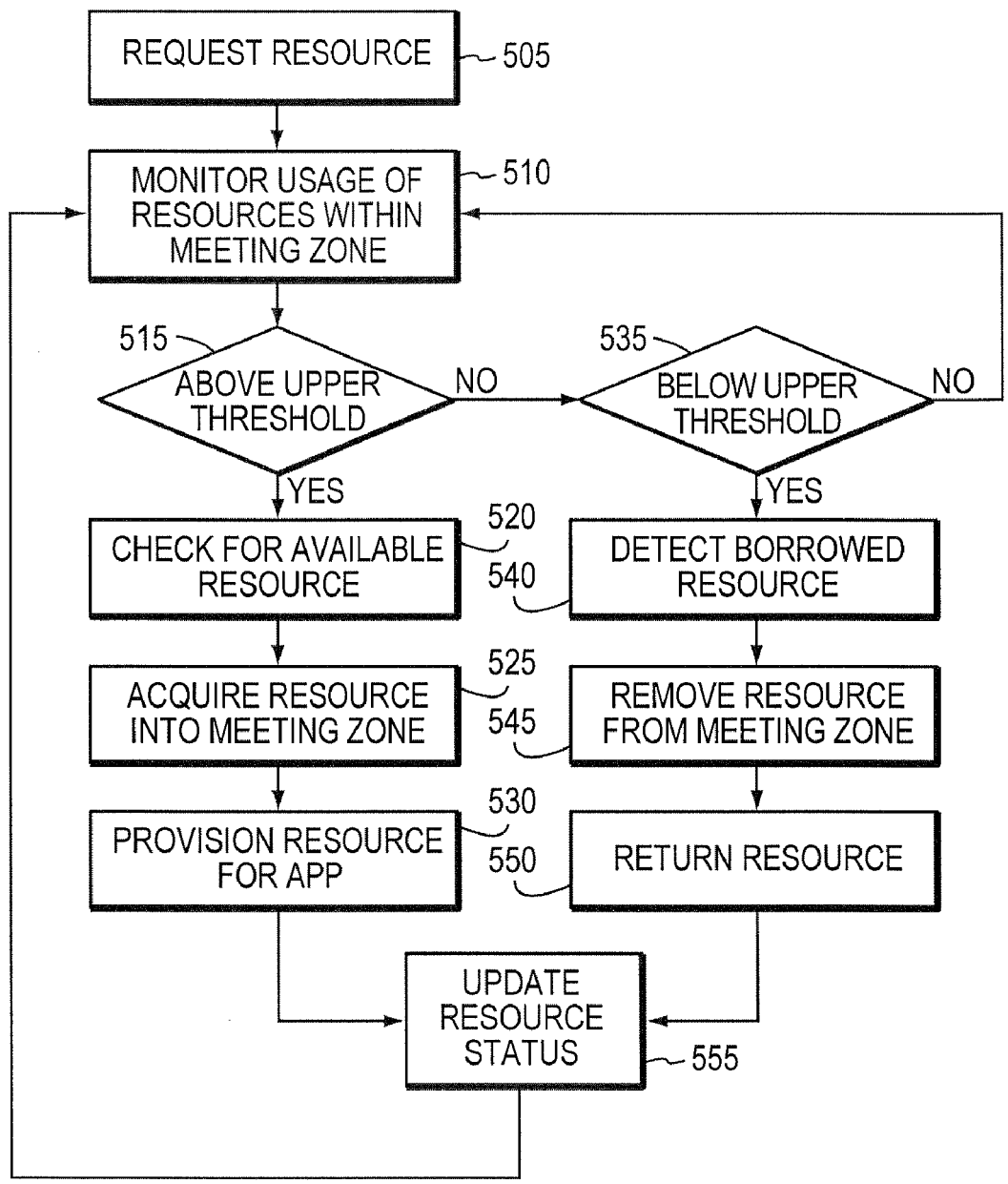
FIG. 5 is a flow diagram consistent with one embodiment of the methods and apparatuses for managing resources within a collaboration system.

The flow diagram as depicted in FIG. 5 is one embodiment of the methods and apparatuses for managing resources within a collaboration system. The blocks within the flow diagram can be performed in a different sequence without departing from the spirit of the methods and apparatuses for managing resources within a collaboration system. Further, blocks can be deleted, added, or combined without departing from the spirit of the methods and apparatuses for managing resources within a collaboration system.

The flow diagram in FIG. 5 illustrates managing resources within a collaboration system according to one embodiment of the invention.

In Block 505, a resource is requested. In one embodiment, a client requests the resource. Further, the client may be initiating a collaboration session. In one embodiment, the request for a resource is assigned to a particular meeting zone.

In Block 510, the usage of the resources within the requested meeting zone is monitored. In one embodiment, the pool boxes within the requested meeting zone are monitored for usage and capacity.

In one embodiment, CPU utilization, memory consumption, and bandwidth consumption are parameters monitored on each pool box within the meeting zone to calculate the usage and capacity of this meeting zone. In one embodiment, usage of the pool boxes within a meeting zone is defined by the following equation:

$$\text{Usage} = \sqrt{\left(\frac{100-CPU}{100}\right)^2 + \left(\frac{100-Mem}{100}\right)^2 + \left(\frac{100-Band}{100}\right)^2} \quad \text{(Equation 1)}$$

According to Equation 1, the usage measurement on each pool box is calculated utilizing the pool box's instant availabilities as Euclid's distance in this three dimensional space as represented by the elements of CPU utilization, memory consumption, and bandwidth consumption.

In one example, the load on each pool box within a meeting zone is equalized such that each pool box within a particular meeting zone carries the same load. In another example, each pool box within the meeting zone is utilized prior to utilizing another pool box within the particular meeting zone.

In one embodiment, each meeting zone's capacity and usage is calculated by aggregating the capacity of all of the pool boxes. In another embodiment, each meeting zone's capacity and usage is calculated based on the number of unused pool boxes assigned to the particular meeting zone.

In Block 515, the capacity of the meeting zone is compared against the upper threshold. In one embodiment, the upper threshold is a percentage of the total capacity of the resource. In one example, the upper threshold is set at 75% such that the upper threshold is set at 75% of the resource's capacity. Although 75% is utilized as one example, any percentage can be set as the upper threshold.

If the capacity of the meeting zone is above the upper threshold in Block 515, then availability of resources outside of the meeting zone are identified in Block 520. In one embodiment, the resource detection module 310 identifies these resources. In another embodiment, the pool database 405 and pool managers 410 and 411 also identify these resources.

In Block 525, the identified resource outside of the meeting zone is acquired into the particular meeting zone that is above the upper threshold. In one embodiment, the pool managers 410 and 411 acquire the resource into the particular meeting zone.

In Block 530, the resource acquired into the meeting zone is provisioned according the client requesting the resource. In one embodiment, the client is requesting the resource for a collaboration session. In one embodiment, the resource is provisioned by the meeting zone manager 430 or 431 that corresponds with the particular meeting zone. In one embodiment, each of the resources is pre-configured to support multiple applications such that the particular application requested by the client is readily available from the resources. In another embodiment, each of the resources is pre-configured to support multiple versions of the same application.

If the capacity of the meeting zone is below the upper threshold in Block 515, then the capacity of the meeting zone is compared against the lower threshold in Block 535. In one embodiment, the lower threshold is a percentage of the total capacity of the resource. In one example, the lower threshold is set at 25% such that the lower threshold is set at 25% of the resource's capacity. Although 25% is utilized as one example, any percentage can be set as the lower threshold.

If the capacity of the meeting zone is below the upper threshold in Block 535, then the borrowed resources within the particular meeting zone are identified in Block 540. In one embodiment, the resource detection module 310 identifies these resources. In another embodiment, the pool database 405 and pool managers 410 and 411 also identify these resources. By referring to borrowed resources, there may be any arbitrary number or pool boxes (i.e. resources) that are attributed as a core resource of the meeting zone and the remaining resources are borrowed resources. In one example, all the resources within the meeting zone may be considered a borrowed resource.

In Block 545, the borrowed resource within the meeting zone is removed from the particular meeting zone that is below the lower threshold. In one embodiment, the pool managers 410 and 411 remove the resource from the particular meeting zone.

In Block 550, the borrowed resource is returned to a general pool of resources where this resource can be acquired into another meeting zone as requested.

In Block 555, the status of the resource whether newly acquired into a meeting zone or removed from a meeting zone is reported and tracked. In one embodiment, the pool database 405 is utilized for the current status of each resource.

In use, if a meeting zone's usage exceeds the upper threshold, then the meeting zone is requesting extra pool box from the pool managers 410 and 411. If meeting zone's usage drops below the lower threshold, then the meeting zone manager will release the pool box back to one of the pool managers 410 and 411.

In one embodiment, the meeting zone manager remembers the origin of the pool boxes regarding the pool box's original zone. In other words, the meeting zone manager is capable of distinguishing between a loaned pool box and an original pool box.

The foregoing descriptions of specific embodiments of the invention have been presented for purposes of illustration and description. The invention may be applied to a variety of other applications.

They are not intended to be exhaustive or to limit the invention to the precise embodiments disclosed, and naturally many modifications and variations are possible in light of the above teaching. The embodiments were chosen and described in order to explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method comprising:
 utilizing an application within a meeting zone;
 monitoring usage within the meeting zone by a processor;
 detecting a computational or storage resource located within the meeting zone to support utilization of one or more versions of the application and returning the computational or storage resource to a resource pool when the monitored usage within the meeting zone falls below a predetermined lower threshold;
 dynamically removing the computational or storage resource from the meeting zone; and updating a database configured to track a status of the computational or storage resource.

2. The method according to claim 1 further comprising storing the status of the computational or storage resource in a pool database.

3. The method according to claim 1 wherein the meeting zone is configured to host a collaboration session.

4. A method comprising:
utilizing an application within a meeting zone;
monitoring usage within the meeting zone by a processor;
detecting a computational or storage resource located outside the meeting zone;
dynamically adding the computational or storage resource to the meeting zone, the computational or storage resource to support utilization of one or more versions of the application within the meeting zone;
updating a database configured to track a status of the computational or storage resource;
dynamically removing the computational or storage resource from the meeting zone and returning the computational or storage resource to a resource pool when monitored usage within the meeting zone falls below a predetermined threshold; and
updating the database configured to track the status of the computational or storage resource to reflect that the computational or storage resource is returned to the resource pool.

5. The method according to claim 4 further comprising storing the status of the computational or storage resource in a pool database.

6. The method according to claim 4 wherein the meeting zone is configured to host a collaboration session.

7. The method according to claim 4 wherein removing the computational or storage resource occurs while utilizing the application within the meeting zone.

8. The method according to claim 4 wherein the application is a collaboration session application.

9. The method according to claim 4 wherein dynamically adding the computational or storage resource further comprises requesting the computational or storage resource from a pool of resources.

10. The method according to claim 4 wherein dynamically adding the computational or storage resource in the meeting zone is accomplished when the usage within the meeting zone exceeds a predetermined upper threshold.

11. The method according to claim 4 wherein the status of the computational or storage resource includes one of a current location of the resource, an origin location of the resource, and a current utilization of the resource.

12. A system comprising:
a processor;
means for utilizing an application within a meeting zone;
means for monitoring usage within the meeting zone;
means for detecting a computational or storage resource located outside the meeting zone;
means for dynamically adding the computational or storage resource to the meeting zone, the computational or storage resource to support utilization of one or more versions of the application within the meeting zone;
means for storing a database configured to track a status of the computational or storage resource; and
means for dynamically removing the computational or storage resource from the meeting zone and returning the computational or storage resource to a resource pool when the monitored usage within the meeting zone falls below a predetermined lower threshold.

13. A system, comprising:
a processor; and
a memory coupled to the processor and configured to store a plurality of software modules executable by the processor, the software modules including,
a resource detection module configured to detect a status of a computational or storage resource,
a meeting zone detection module configured to detect use of a meeting zone,
a pool manager module configured to dynamically allocate the computational or storage resource to the meeting zone based on the use of the meeting zone, to support utilization of one or more versions of an application within the meeting zone, and to dynamically remove the computational or storage resource from the meeting zone and return the computational or storage resource to a pool of resources when the detected use of the meeting zone falls below a predetermined lower threshold, and
a storage module configured to store the status of the computational or storage resource.

14. The system according to claim 13 wherein the meeting zone detection module is configured to detect the use of the meeting zone relative to a predetermined upper threshold.

15. The system according to claim 13 wherein the storage module stores a pool database.

16. The system according to claim 13 wherein the meeting zone is configured to host a collaboration session.

17. The system according to claim 13 wherein the pool manager module is further configured to cause removal of the computational or storage resource to occur while an application is used within the meeting zone.

18. The system according to claim 13 wherein the use of the meeting zone includes establishment of a collaborative session through the meeting zone.

19. The system according to claim 13 wherein the pool manager is further configured to dynamically allocate the computational or storage resource with a request for the computational or storage resource from a pool of resources.

20. The system according to claim 13 wherein the pool manager is further configured to dynamically allocate the computational or storage resource in the meeting zone when usage within the meeting zone exceeds a predetermined upper threshold.

21. The system according to claim 13 wherein the status of the computational or storage resource includes one of a current location of the resource, an origin location of the resource, and a current utilization of the resource.

* * * * *